(12) United States Patent
Song et al.

(10) Patent No.: US 7,811,694 B2
(45) Date of Patent: Oct. 12, 2010

(54) POLYMER ELECTROLYTE FOR A DIRECT OXIDATION FUEL CELL, METHOD OF PREPARING THE SAME, AND DIRECT OXIDATION FUEL CELL COMPRISING THE SAME

(75) Inventors: Min-Kyu Song, Suwon-si (KR); You-Mee Kim, Suwon-si (KR); Ho-Jin Kweon, Suwon-si (KR); Hee-Woo Rhee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 997 days.

(21) Appl. No.: 11/251,579

(22) Filed: Oct. 14, 2005

(65) Prior Publication Data

US 2006/0251945 A1    Nov. 9, 2006

(30) Foreign Application Priority Data

Oct. 14, 2004  (KR) .................. 10-2004-0082155
Jun. 27, 2005  (KR) .................. 10-2005-0055834

(51) Int. Cl.
*H01M 8/10* (2006.01)

(52) U.S. Cl. ................... 429/33; 521/27; 521/28; 521/32; 526/243; 204/282

(58) Field of Classification Search ............. 429/33; 521/27, 28, 32; 526/243; 204/282
See application file for complete search history.

(56) References Cited

U.S. PATENT DOCUMENTS

| | | |
|---|---|---|
| 4,330,654 A | 5/1982 | Ezzell et al. |
| 4,358,545 A | 11/1982 | Ezzell et al. |
| 4,417,969 A | 11/1983 | Ezzell et al. |
| 4,433,082 A | 2/1984 | Grot |
| 4,610,762 A | 9/1986 | Birdwell |
| 4,940,525 A | 7/1990 | Ezzell et al. |
| 5,094,995 A | 3/1992 | Butt et al. |
| 5,547,551 A | 8/1996 | Bahar et al. |
| 5,595,676 A | 1/1997 | Barnes et al. |
| 5,596,676 A | 1/1997 | Swaminathan et al. |
| 5,599,614 A | 2/1997 | Bahar et al. |

(Continued)

FOREIGN PATENT DOCUMENTS

EP    1 263 066 A2    12/2002

(Continued)

OTHER PUBLICATIONS

Korean Patent Abstracts for Publication No. 1020030045324, Date of publication of application: Jun. 11, 2003, in the name of Ha Cheol Jung et al.

(Continued)

*Primary Examiner*—Peter D. Mulcahy
*Assistant Examiner*—Henry Hu
(74) *Attorney, Agent, or Firm*—Christie, Parker & Hale, LLP

(57) ABSTRACT

A polymer electrolyte membrane for a direct oxidation fuel cell includes a porous polymer supporter having a plurality of pores, and a hydrocarbon fuel diffusion barrier layer which is formed on the polymer supporter and contains an inorganic additive dispersed in a cation exchange resin.

28 Claims, 10 Drawing Sheets

U.S. PATENT DOCUMENTS

| | | | |
|---|---|---|---|
| 6,638,659 B1 * | 10/2003 | Fenton et al. | 429/40 |
| 6,787,007 B2 | 9/2004 | Lessing | |
| 2003/0032739 A1 | 2/2003 | Kerres et al. | |
| 2004/0044160 A1 | 3/2004 | Ito et al. | |
| 2004/0247975 A1 * | 12/2004 | Song et al. | 429/33 |

FOREIGN PATENT DOCUMENTS

| | | | |
|---|---|---|---|
| EP | 1 284 518 A1 | | 2/2003 |
| EP | 1284518 A1 * | | 2/2003 |
| EP | 1 289 043 A1 | | 3/2003 |
| EP | 1289043 A1 * | | 3/2003 |
| EP | 1 263 066 A3 | | 10/2005 |
| EP | 1648047 A1 * | | 4/2006 |
| JP | 7-65624 | | 3/1995 |
| JP | 2000-516014 | | 11/2000 |
| JP | 2003-335895 | | 11/2003 |
| JP | 2005-267856 | | 9/2005 |
| JP | 2006-179448 | | 7/2006 |
| KR | 2003-0032321 | | 4/2003 |
| KR | 2003-0045234 | | 6/2003 |
| KR | 2003-0045324 | | 6/2003 |
| KR | 2003-0078860 | | 10/2003 |
| KR | 10-2004-0047240 | | 6/2004 |
| KR | 10-2004-0047420 | | 6/2004 |
| KR | 10-2004-0051287 | | 6/2004 |
| KR | 10-2004-0104842 | | 12/2004 |
| WO | WO-96/29752 | * | 9/1996 |
| WO | WO 96/29752 | | 9/1996 |
| WO | WO 02/103834 A1 | | 12/2002 |

OTHER PUBLICATIONS

Korean Patent Abstracts for Publication No. 1020040047420; Date of publication of application: Jun. 5, 2004, in the name of Ji Seok Hwang et al.

Patent Abstracts of Japan, Publication No. 07-065624, dated Mar. 10, 1995, in the name of Keiichi Koseki et al.

Korean Patent Abstracts, Publication No. 1020030032321 A, dated Apr. 26, 2003, in the name of Min Kyu Song.

Korean Patent Abstracts, Publication No. 1020040104842 A, dated Dec. 13, 2004, in the name of Hui Rok Jung et al.

European Search Report, dated Mar. 6, 2006, for Application No. 05109576.8, in the name of Samsung SDI Co., Ltd.

Korean Patent Abstracts, Publication No. 1020030045234 A; Publication Date: Jun. 11, 2003; in the name of Ha.

Korean Patent Abstracts, Publication No. 1020040047240 A; Publication Date: Jun. 5, 2004; in the name of Bae, et al.

Korean Patent Abstracts, Publication No. 1020040051287 A; Publication Date: Jun. 18, 2004; in the name of Kim.

* cited by examiner

POLYMER ELECTROLYTE FOR A DIRECT OXIDATION FUEL CELL, METHOD OF PREPARING THE SAME, AND DIRECT OXIDATION FUEL CELL COMPRISING THE SAME

CROSS-REFERENCE TO RELATED APPLICATION

This application claims priority to and the benefit of Korean Patent Application No. 10-2004-0082155 filed with the Korean Intellectual Property Office on Oct. 14, 2004, and Korean Patent Application No. 10-2005-0055834 filed with the Korean Intellectual Property Office on Jun. 27, 2005, the entire contents of which are incorporated herein by reference.

FIELD OF THE INVENTION

The present invention relates to a polymer electrolyte membrane for a direct oxidation fuel cell, a method of preparing the same and a direct oxidation fuel cell system comprising the same. More particularly, the present invention relates to a direct oxidation fuel cell system having a high power density using a thin membrane to prevent permeability of a hydrocarbon fuel.

BACKGROUND OF THE INVENTION

A fuel cell is a power generation system for producing electrical energy through an electrochemical redox reaction of an oxidant and hydrogen in a hydrocarbon-based material such as methanol, ethanol or natural gas.

Typical examples of fuel cells are polymer electrolyte membrane fuel cells (PEMFC) and direct oxidation fuel cells (DOFC). A direct oxidation fuel cell which uses methanol as a fuel is called a direct methanol fuel cell (DMFC). The polymer electrolyte membrane fuel cell is an environmentally-friendly energy source that can replace fossil fuel energy. It has advantages such as high power output density, high energy conversion efficiency, operability at room temperature, and the capability to be down-sized and tightly sealed. Therefore, it can be widely applied to various areas such as non-polluting automobiles, residential electricity generation systems, and as portable power sources for mobile communication equipment and military equipment.

The polymer electrolyte membrane fuel cell has the advantage of having high energy density, but also has the problems of requiring careful handling of the hydrogen gas, or requiring accessory facilities such as a fuel reforming processor for reforming fuel gas such as methane, methanol, or natural gas to produce the hydrogen required.

In contrast, a direct oxidation fuel cell generally has a lower energy density than a polymer electrolyte fuel cell, but has the advantage of easy handling of the liquid-type fuel, low operation temperatures, and does not require additional fuel reforming processors. Therefore, such direct oxidation fuel cells may be appropriate systems for small-scale and general purpose portable power sources.

In a fuel cell, the stack that actually generates electricity includes several to scores of unit cells stacked in multi-layers, each unit cell made up of a membrane-electrode assembly (MEA) and a separator (also referred to as a bipolar plate). The membrane-electrode assembly has an anode (referred to as a fuel electrode or an oxidation electrode) and a cathode (referred to as an air electrode or a reduction electrode) separated from one another by an electrolyte membrane.

A perfluorosulfonic acid resin membrane (NAFION®) having good conductivity, mechanical properties and chemical resistance has commonly been used for the polymer electrolyte membrane.

In general, a thicker perfluorosulfonic acid resin membrane provides better dimensional stability and mechanical properties, but increased membrane resistance. A thinner membrane provides lower membrane resistance, but worse mechanical properties whereby unreacted fuel gas and liquid tend to pass through the polymer membrane resulting in lost unreacted fuel during operation and lower performance of the cell.

Particularly, a polymer electrolyte membrane thermally compressed with a platinum catalyst electrode undergoes a change of 15 to 30% in membrane thickness and volume depending on temperature and degree of hydration, and results in a volume change of over 200% maximum with a 3 to 50 wt % methanol fuel. The thickness increases by such swelling of the electrolyte membrane and applies stress to the gas diffusion layer which is the electrode substrate. A change in the surface dimensions of the membrane induces physical deterioration of the interface between the catalyst particles and electrolyte membrane when the fuel cell is operated for long durations.

SUMMARY OF THE INVENTION

A first embodiment of the present invention provides a polymer electrolyte membrane for direct oxidation fuel cells which has good electrochemical characteristics, thermal stability, dimensional stability and mechanical characteristics, and reduced cross-over of hydrocarbon fuel.

A second embodiment of the present invention provides a method of preparing the polymer electrolyte membrane for direct oxidation fuel cells.

A third embodiment of the present invention provides a membrane-electrode assembly which includes the polymer electrolyte membrane.

A fourth embodiment of the present invention provides a direct oxidation fuel cell which includes the membrane-electrode assembly.

According to the first embodiment of the present invention, a polymer electrolyte membrane for a direct oxidation fuel cell includes a porous polymer supporter having a plurality of pores, and a hydrocarbon fuel diffusion barrier layer formed on the polymer supporter. The hydrocarbon fuel diffusion barrier layer includes a cation exchange resin with an inorganic additive (inorganic filler) dispersed in the cation exchange resin.

The inorganic additive may be delaminated into a nano-phase form in the cation exchange resin by intercalation of the cation exchange resin chains.

Non-limiting examples of the inorganic additive include additives selected from the group consisting of silica, alumina, zeolite, barium titanate, ceramics, inorganic silicate, zirconium hydrogen phosphate, $\alpha\text{-Zr}(O_{a1}PCH_{a2}OH)_a(O_{b1}PC_{b2}H_{b4}SO_{b5}H)_b \cdot nH_2O$ (where a1, a2, a, b1, b2, b4, b5 and b are the same or different from each other, and each is an integer from 0 to 14, and n is an integer ranging from 0 to 50), $\text{v-Zr}(PO_{a1})(H_{a2}PO_{a3})_a(HO_{b1}PC_{b2}H_{b3}SO_{b4}H)_b \cdot nH_2O$ (where a1, a2, a3, a, b1, b2, b3, b4 and b are the same or different from each other and each is an integer from 0 to 14, and n is an integer from 0 to 50), $\text{Zr}(O_{a1}PC_{a2}H_{a3})_aY_b$ (where a1, a2, a3, a and b are the same or different from each other and each is an integer from 0 to 14), $\text{Zr}(O_{a1}PCH_{a2}OH)_aY_b \cdot nH_2O$ (where a1, a2, a and b are the same or different from each other and each is an integer from 0 to 14, and n is an integer from 0 to 50), $\alpha\text{-Zr}(O_{a1}PC_{a2}H_{a3}SO_{a4}H)_a \cdot nH_2O$ (where a1, a2, a3, a4 and a are the same or different from each other and each is an integer from 0 to 14, and n is an integer from 0 to 50), $\alpha$-Zr($O_{a1}$POH).$H_2O$ (where a1 is an integer from 0 to 14), $(P_2O_5)_a(ZrO_2)_b$ glass (where a and b are the same or different from each other and each is an integer from 0 to 14), $P_2O_5$—$ZrO_2$—$SiO_2$ glass, and mixtures thereof. In one embodiment, inorganic silicate is most preferred.

The silicate has a plate-shaped layered structure and includes pyrophylite-talc, montmorillonite (MMT), fluorohectorite, kaolinite, vermiculite, illite, mica, or brittle mica. The silicates are dispersed in a nano-phase in the cation exchange resin, and polymer chains are intercalated between the dispersed silicate plates to delaminate the silicate.

The inorganic silicate preferably has an aspect ratio (a ratio of thickness relative to a long axis length) ranging from 1/30 to 1/1000, and a long-axis length ranging from 0.05 μm to 0.5 μm. When the inorganic silicate is delaminated in the cation exchange resin, the distance between the silicate layers is preferably a minimum of 3 nm. The distance between the silicate layers is defined as the distance between delaminated layers when the polymer chains are intercalated in the plate-phase silicate, and in one embodiment, is a minimum of 3 nm. As more polymer chains intercalate and the distance between the layers increases, the silicate layers become dispersed in a disordered manner such that the term "a distance between layers" is no longer appropriate as it becomes difficult to measure. Thus it is sufficient to set the distance between layers to a minimum of 3 nm, with the maximum being the point at which the layers are so disordered and dispersed that the distance cannot be measured.

In one embodiment, the polymer membrane has a preferred thickness ranging from 5 μm to 100 μm.

In another embodiment the polymer supporter has a preferred thickness ranging from 10 μm to 15 μm, and the hydrocarbon fuel diffusion barrier layer has a preferred thickness ranging from 2 μm to 10 μm.

According to the second embodiment of the present invention, a method of preparing a polymer electrolyte membrane includes: obtaining a mixed solution by mixing a cation exchange resin liquid and a solid-phase or liquid-phase inorganic additive, and coating the mixed solution onto a porous polymer supporter to fabricate a polymer membrane. The cation exchange resin liquid is prepared by dissolving in a first organic solvent a cation exchange resin having a side chain of a cation exchange group.

According to one embodiment of the present invention, the first organic solvent is selected from the group consisting of N-methyl-2-pyrrolidone (NMP), dimethylformamide (DMF), dimethyl acetamide (DMA), tetrahydrofuran (THF), dimethyl sulfoxide (DMSO), acetone, methylethylketone (MEK), tetramethylurea, trimethylphosphate, butyrolactone, isophorone, carbitol acetate, methylisobutylketone, N-butyl acetate, cyclohexanone, diacetone alcohol, diisobutyl ketone, ethylacetoacetate, glycol ether, propylene carbonate, ethylene carbonate, dimethylcarbonate, diethylcarbonate, and mixtures thereof.

In one embodiment, the inorganic additive is preferably mixed in an amount from 0.5 to 10 parts by weight in the mixed solution based on 100 parts by weight of the cation exchange resin liquid.

According to the third embodiment of the present invention, a membrane-electrode assembly for a fuel cell is provided that includes the polymer electrolyte membrane described above.

According to the fourth embodiment of the present invention, a fuel cell includes the membrane-electrode assembly described above.

DETAILED DESCRIPTION OF THE INVENTION

Figure 1A:
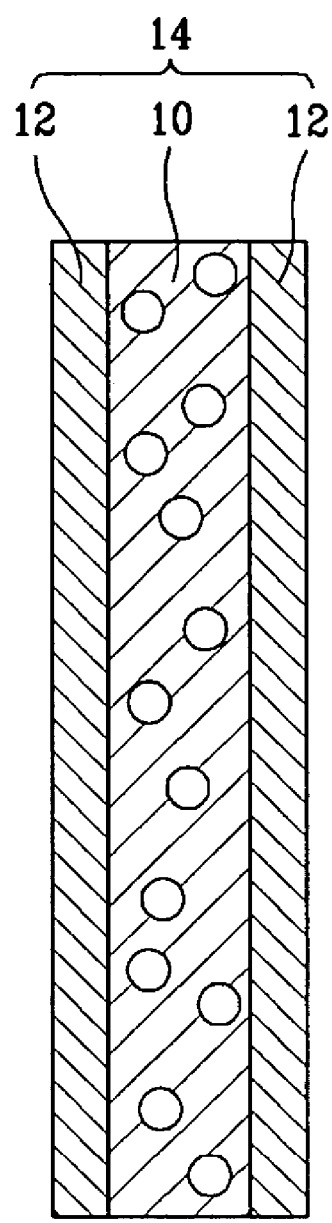
FIG. 1A shows a polymer electrolyte membrane of the present invention.

Referring to FIG. 1A, the present invention relates to a polymer electrolyte membrane 14 for a direct oxidation fuel cell which includes a porous polymer supporter 10 with a hydrocarbon fuel diffusion barrier layer 12 formed on the polymer supporter.

The hydrocarbon fuel diffusion barrier layer includes inorganic additives dispersed in a cation exchange resin. In the present invention, the term "fuel" refers to gas or liquid hydrocarbon fuel, and typical examples include methanol, ethanol, propanol, butanol and natural gas.

Even though the polymer electrolyte membrane has a thickness ranging from 5 μm to 100 μm, and preferably from 5 μm to 50 μm, the supporter can improve the dimensional stability of the polymer electrolyte membrane against moisture-dependent expansion or contraction and maintains the physical properties of the electrode-electrolyte interface and lengthens the life-span of the fuel cell. The present invention can help avoid the use of perfluorosulfonic acid membranes that are 130 μm to 180 μm thick in direct oxidation fuel cells which have increased membrane resistance. According to the present invention, the thickness of the polymer electrolyte membrane can be reduced as can the membrane resistance, resulting in smaller-sized fuel cell systems that can be used in small portable electronic device such as mobile phones.

Korean Patent Publication Nos. 2004-51287, 2003-45324 and 2004-47420 disclose polymer electrolyte membranes using inorganic additives. However, the polymer electrolyte membranes disclosed in such prior art do not use a porous polymer supporter, and therefore, membranes of about 30 μm thickness as in the present invention would be mechanically fragile and hydrogen-permeable, and would display excessive cross-over of hydrocarbon fuels such as methanol. The inventors of the present invention have unexpectedly discovered that by including a porous polymer supporter, a thin membrane can be provided with good strength and durability without permitting excessive fuel cross-over.

The porous polymer supporter includes a material selected from the group consisting of homopolymers of polytetrafluoroethylene, polyvinylidene fluoride, polyethylene, polypropylene, polyimide, polybenzoxazole, and polybenzimidazole, and copolymers thereof. Where the cation exchange resin includes a homopolymer of a fluorine-based resin, preferred materials for the porous polymer supporter include polytetrafluoroethylene, polyvinylidene fluoride, or copolymers thereof in order to improve interface adhesion between the polymer supporter and the cation exchange resin. For such an embodiment, a polytetrafluoroethylene homopolymer is most preferred.

The cation exchange resin includes a polymer resin containing as a side chain a cation exchange group selected from the group consisting of a sulfonic acid group, a carboxylic acid group, a phosphoric acid group, a phosphonic acid group and derivatives thereof.

Non-limiting examples of the cation exchange resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers and polyphenylquinoxaline-based polymers. Preferred proton conductive polymers include fluoro-based polymers, polybenzimidazole-based polymers and polysulfone-based polymers.

Specific examples of fluoro-based polymers include poly (perfluorosulfonic acid) (NAFION®, E.I. Dupont de Nemours Company) of formula 1 below, Aciplex™ (Asahi Kasei Chemical), Flemion™ (Asahi Glass) and Fumion™ (commercialized as fumatech) fluorocarbon vinyl ether of formula 2 below, or vinyl ether fluoride of formula 3 below. The polymers disclosed in U.S. Pat. Nos. 4,330,654, 4,358,545, 4,417,969, 4,610,762, 4,433,082, 5,094,995, 5,595,676 and 4,940,525 may also be used.

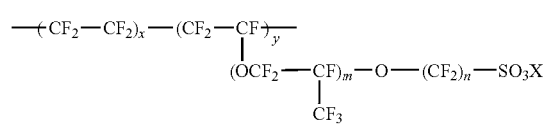

(1)

wherein in above formula 1, X is H, Li, Na, K, Cs, tetrabutyl ammonium or NR1R2R3R4, where R1, R2, R3 and R4 are independently selected from H, CH$_3$ and C$_2$H$_5$, m is at least 1, n is at least 2, x ranges from about 3.5 to 5, and y is at least 1,000.

$$MSO_2CFR_fCF_2O[CFYCF_2O]_nCF=CF_2 \quad (2)$$

wherein in formula 2, Rf is fluorine or a C$_1$ to C$_{10}$ perfluoroalkyl radical, Y is fluorine or a trifluoromethyl radical, n is from 1 to 3, M is selected from the group consisting of fluorine, a hydroxyl radical, an amino radical and —OMe where Me is an alkali metal radical or a quaternary ammonium radical.

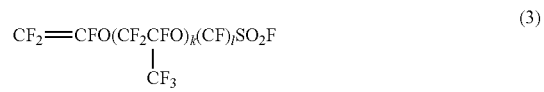

(3)

wherein in formula 3, k is 0 or 1, and 1 is an integer from 3 to 5.

The sulfonic acid terminal groups of the above perfluorosulfonic acid (NAFION®) are hydrated to form a micelle structure, which provides a proton transfer path and behaves like a typical aqueous acid solution. In the present invention, when perfluorosulfonic acid (NAFION®) is used as a cation exchange resin, X in the ionic exchange group (—SO$_3$X) of the terminal end of the side chain can be substituted with a univalent ion such as hydrogen ion, sodium ion, potassium ion, cesium ion, or tetrabutylammonium.

Specific examples of benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers and polyphenylquinoxaline-based polymers include polybenzimidazole, polyimide, polysulfone, polysulfone derivatives, sulfonated poly(ether ether ketone) (s-PEEK), polyphenyleneoxide, polyphenylenesulfide, and polyphosphazane.

Alternatively, an electrolyte membrane where a polystyrenesulfonic acid polymer is grafted on a polyethylene, a polypropylene polymer, a fluoroethylene polymer, or a ethylene/tetrafluoroethylene polymer may be used.

The proton conductivity of the cation exchange resin can be adjusted by equivalent weight. Meanwhile, the "ion exchange ratio of the ion exchange resin" is defined to be determined by the number of carbons in the polymer backbone and the number of cation exchange groups. According to one embodiment of the present invention, the ion exchange ratio ranges from 3 to 33. This corresponds to about 700 to 2,000 of equivalent weight (EW).

The equivalent weight values are defined as the weight of an acidic polymer required to neutralize 1 equivalent of base (NaOH). When the equivalent weight is excessively large, the resistance increases, whereas when it is excessively small, its mechanical properties deteriorate. Therefore, the equivalent weight needs to be controlled within an appropriate range to provide sufficiently low resistance with sufficient mechanical properties.

The inorganic additive increases mechanical strength and reduces cross-over of hydrocarbon fuel such as methanol. Non-limiting examples of the inorganic additive include materials selected from the group consisting of silica (for example, fumed silica, Aerosil, Cab-O-Sil™), alumina, mica, zeolite (SAPO-5™, XSM-5™, AlPO-5™, VPI-5™, MCM-41™ and the like), bariumtitanate, ceramic, inorganic silicate, zirconium hydrogen phosphate, α-Zr(O$_{a1}$PCH$_{a2}$OH)$_a$ (O$_{b1}$PC$_{b2}$H$_{b4}$SO$_{b5}$H)$_b$.nH$_2$O (where a1, a2, a, b1, b2, b4, b5 and b are the same or different from each other and each is an integer from 0 to 14, and n is an integer from 0 to 50), v-Zr(PO$_{a1}$) (H$_{a2}$PO$_{a3}$)$_a$(HO$_{b1}$PC$_{b2}$H$_{b3}$SO$_{b4}$H)$_b$.nH$_2$O (where a1, a2, a3, a, b1, b2, b3, b4 and b are the same or different from each other and each is an integer from 0 to 14, and n is an integer from 0 to 50), Zr(O$_{a1}$PC$_{a2}$H$_{a3}$)$_a$Y$_b$(where a1, a2, a3, a and b are the same or different from each other and each is an integer from 0 to 14), Zr(O$_{a1}$PCH$_{a2}$ OH)$_a$Y$_b$.nH$_2$O (where a1, a2, a and b are the same or different from each other and each is an integer from 0 to 14, and n is an integer from 0 to 50), $\alpha\text{-}Zr(O_{a1}PC_{a2}H_{a3}SO_{a4}H)_a\cdot nH_2O$ (where a1, a2, a3, a4 and a are the same or different from each other and each is an integer from 0 to 14, and n is an integer from 0 to 50), $\alpha\text{-}Zr(O_{a1}POH)\cdot H_2O$ (where a1 is an integer from 0 to 14), $(P_2O_5)_a(ZrO_2)_b$ glass (where a and b are the same or different from each other and each is an integer from 0 to 14) $P_2O_5$—$ZrO_2$—$SiO_2$ glass, and combinations thereof. Inorganic silicate is a preferred inorganic additive.

Figure 1B:
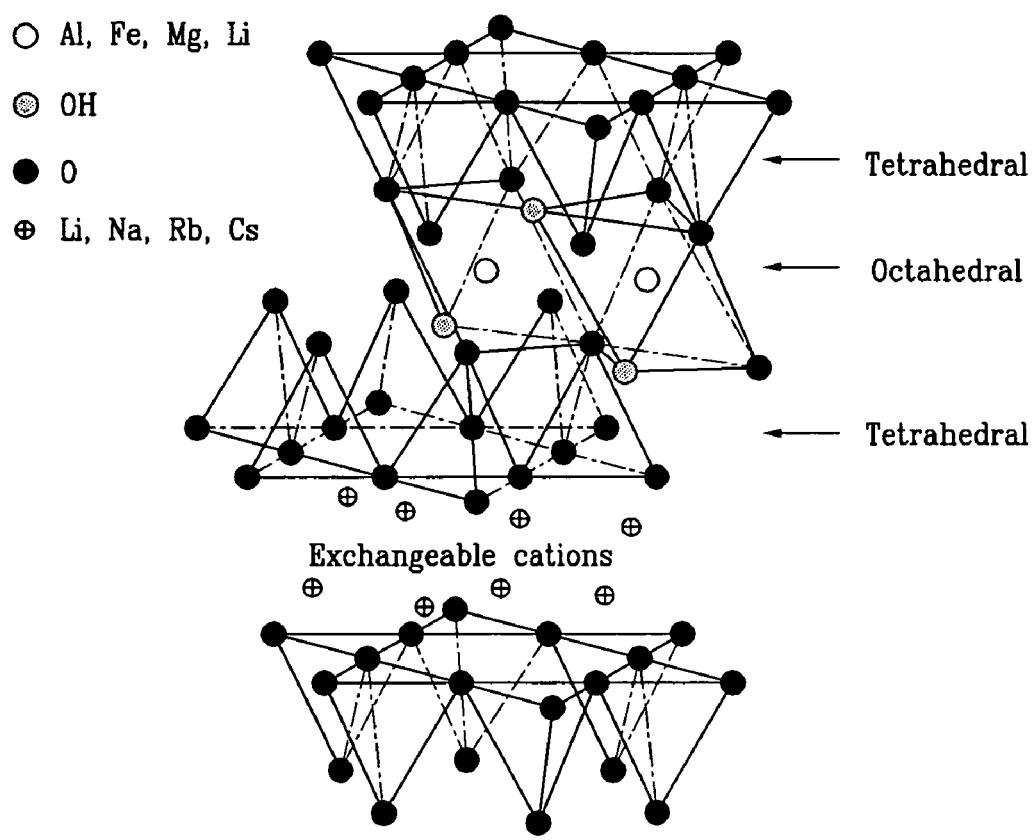
FIG. 1B shows the structure of the inorganic silicate used in the present invention.

According to one embodiment, the inorganic silicate is a clay, that is, generally a mostly layered silicate. As shown in FIG. 1B, its basic structure is composed of a combination of a silica tetrahedral sheet and an alumina octahedral sheet and is a layered structure formed through a condensation reaction by hydroxyl groups of the two sheets.

The silicate can be classified into pyrophylite-talcs, montmorillonites (MMT), fluorohectorites, kaolinites, vermiculites, illites, micas, or brittle micas depending on the quantities of negative electric charges, and any one of such materials may be used in the present invention. In one embodiment of the present invention, montmorillonites are preferred.

The montmorillonite has a structure wherein the $Al^{3+}$ ion is replaced with $Mg^{2+}$, $Fe^{2+}$, or $Fe^{3+}$ ion in an alumina octahedral sheet and the $Si^{4+}$ ion is replaced with $Al^{3+}$ ion in a silicate tetrahedral sheet and has an overall negative charge. Further, exchangeable cations and water molecules are included between silicate layers in order to maintain the overall charge equilibrium.

In one embodiment, the silicate has an aspect ratio ranging from 1/30 to 1/1000, preferably from 1/100 to 1/800, and more preferably from 1/500 to 1/800. When the aspect ratio of the silicate is more than 1/30, delaminated silicates cannot act as a diffusion barrier for gas and liquid and its barrier properties deteriorate. When the aspect ratio of the silicates is less than 1/1000, delamination by intercalation of cation exchange resin chains is difficult, with the result that the silicates do not disperse within the cation exchange resin in the polymer electrolyte membrane.

In one embodiment, the long-axis length of the silicates ranges from 0.05 μm to 0.5 μm, and preferably from 0.05 μm to 0.2 μm. When the long-axis length is less than 0.05 μm, plate-shaped structures are not formed and its barrier effect against hydrocarbon fuel decreases, whereas when it is more than 0.5 μm, its dispersion into pores of the supporter is difficult.

The distance between the silicate layers refers to a distance between delaminated layers when the polymer chains are intercalated in the plate-phase silicate. In one embodiment, when the inorganic silicate is delaminated in the cation exchange resin, the distance between the silicate layers is preferably a minimum of 3 nm. As more polymer chains intercalate and the distance between the layers increase, the silicate layers become dispersed in a disordered manner such that the distance between layers cannot be measured. Thus it is sufficient to set the distance between layers to a minimum of 3 nm as setting a maximum value is pointless.

The silicates may be treated with an organic modifying agent. Strong Van der Waals attraction makes it difficult for the plate-shaped silicate to delaminate and disperse in a polymer resin, but treatment with an organic modifying agent of low molecular weight results in its permeation between the plates, facilitating the intercalation of polymer resin, and thus delamination and dispersion.

Suitable organic modifying agents include C1 to C20 alkylamines, C1 to C20 alkylene diamines, C1 to C20 quaternary ammonium salts, aminohexanes and nitrogen-containing heterocyclic compounds.

Specific examples of alkylamines include methylamine hydrochloride, propyl amine, butyl amine, octyl amine, decyl amine, dodecyl amine, hexadecyl amine, octadecyl amine, and N-methyl octadecyl amine.

Non-limiting examples of alkylene diamines include 1,6-hexamethylene diamine, and 1,12-dodecane diamine.

Non-limiting examples of quaternary ammonium salts include dimethyl quaternary ammonium, benzyl quaternary ammonium, 2-ethylhexyl quaternary ammonium, bis-2-hydroxyethyl quaternary ammonium, methyl quaternary ammonium, tetramethyl ammonium chloride, octadecyl trimethyl ammonium bromide, dodecyl trimethyl ammonium bromide, dioctadecyl dimethyl ammonium bromide, and bis(2-hydroxyethyl)methyl octadecyl ammonium chloride.

Non-limiting examples of aminohexanes include 6-aminohexane and 12-aminohexane. A non-limiting example of the nitrogen-containing heterocyclic compounds is 1-hexadecylpyridium chloride.

As mentioned above, the inorganic silicate may be used after treatment with an organic modifying agent. Alternatively, organically modified inorganic silicate may be used. Suitable organically modified inorganic silicates include Cloisite6A, Cloisite10A, Cloisite15A, Cloisite20A, Cloisite25A, and Cloisite30B manufactured by Southern Clay Products. In one embodiment, Cloisite10A is preferred.

In one embodiment, the cation exchange resin and the inorganic additives are both present in both the pores and on the surface of the polymer supporter. In another embodiment, the cation exchange resin is present both in the pores and on the surface of the polymer supporter, and the inorganic additive is present only on the surface of the polymer supporter.

In one embodiment, the polymer supporter has a porosity of 80% or more, and preferably from 80 to 90%. When the porosity of the polymer supporter is less than 80%, the weight of the non-conductive polymer is too high and causes decreased conductivity of the composite membrane. A porosity ranging from 80 to 90% is appropriate for continuous processes for forming a film since it can improve mechanical characteristics of the supporter.

In one embodiment, the difference in conductivity between one surface of the polymer electrolyte membrane and the opposite surface, that is, between the two surfaces on which the catalyst layers are formed, is 5% or less, and preferably from 3 to 5%. Since the surface having a relative conductivity that is lower in the direction of the thickness of the polymer electrolyte membrane determines its membrane resistance, it is preferable for the conductivity difference to be 5% or lower so that ion conductance is facilitated.

In one embodiment of the present invention, the polymer electrolyte membrane has a porosity ranging from 1 to 10%, and preferably from 1 to 5%.

The supporter of the polymer electrolyte membrane of present invention may have a thickness ranging from 10 μm to 15 μm, and the hydrocarbon fuel diffusion barrier layer may have a thickness ranging 2 μm to 10 μm. When the hydrocarbon fuel diffusion barrier layer has a thickness within the above range, the electrolyte membrane has an increased surface roughness and an increased effective surface area per unit area, thereby increasing the contact area between the catalysts and the electrolyte membrane. When the hydrocarbon fuel diffusion barrier layer has a thickness of more than 10 μm, the barrier effect is improved, but its surface becomes flat and the effect of increasing the contact area between catalysts and an electrolyte membrane cannot be achieved. When its thickness is less than 2 μm, the contact area increases, but the barrier effect is decreased.

The polymer electrolyte membrane includes inorganic additives having a layered structure which are delaminated into a nano-phase by intercalation of the cation exchange resin chains. The additives lengthen the passage of liquid or gas phase fuel that passes therethrough, thereby acting as a barrier against liquid fuel. A very thin film of polymer supporter can improve the dimensional stability and mechanical properties of a polymer electrolyte membrane.

According to an embodiment of the present invention, the cation exchange resin of the polymer electrolyte membrane is present in an amount from 50 to 90 wt %, the porous polymer supporter is present in an amount from 2 to 30 wt % and the inorganic additives are present in an amount from 0.5 to 20 wt %. In another embodiment, the cation exchange resin is present in an amount from 70 to 80 wt %, the porous polymer supporter is present in an amount from 2 to 15 wt % and the inorganic additives are present in an amount from 0.5 to 10 wt %. When the amounts of the porous polymer supporter and the inorganic additives are higher than the above ranges, the conductivity of the membrane decreases since both materials are non-conductive. When they are lower than the above ranges, mechanical strength and dimensional stability deteriorate and the desired barrier effect against hydrocarbon fuel is not fully achieved.

According to the present invention, the hydrocarbon fuel diffusion barrier layer may further include an acrylate-based polymer having a low molecular weight. Non-limiting example of acrylate-based polymers include polyethyleneglycol diacrylate and polyethylene glycol dimethacrylate having a molecular weight of less than 1,000. Such low molecular weight acrylate-based polymers easily intercalate into the inorganic additives and help to activate the delamination of the inorganic additives. In one embodiment, from 5 to 10 parts by weight of the acrylate-based polymer is included based on 100 parts by weight of the cation exchange resin.

Hereinafter, a method of preparing the polymer electrolyte membrane is described in more detail.

First, a mixed solution is prepared by mixing a cation exchange resin liquid and a solid-phase or liquid-phase inorganic additive. The cation exchange resin liquid is prepared by dissolving a cation exchange resin having a side chain of a cation exchange group in a first organic solvent.

During the mixing process, the cation exchange resin chains are intercalated between layers of the inorganic additives to delaminate the inorganic additives into nano-sized plates. When an electrolyte membrane is fabricated with this solution, the electrolyte membrane contains plate-shaped inorganic additive that is dispersed in the cation exchange resin to significantly improve the mechanical properties of the polymer electrolyte membrane, and to lengthen the passage of liquid-phase or gas-phase fuel through the polymer electrolyte membrane, thereby reducing fuel permeability.

When nano-size plates of an inorganic additive are delaminated in the polymer electrolyte membrane, the contact area between the organic polymer and the inorganic additive increases and thus enhances molecular attraction and mechanical properties. The delaminated additive acts as a barrier against fuel permeability to significantly reduce crossover of gas or liquid hydrocarbon fuel.

The cation exchange resin liquid is prepared by dissolving 1 to 10 parts by weight of the cation exchange resin in 100 parts by weight of the first organic solvent. When the cation exchange resin is used in an amount of less than 1 part by weight, the cation exchange resin easily intercalates between the layers of the inorganic additives, but takes longer to dry and its viscosity is lower, making it more difficult to coat on the porous polymer supporter. When it used in an amount of more than 10 parts by weight, it takes too long to intercalate between the layers of the inorganic additive.

During the above process, when a commercially available cation exchange resin that is pre-dissolved in a solvent is used, such as perfluorosulfonic acid (NAFION®), which is a 5 wt % NAFION®/$H_2O$/2-propanol solution, it may be used after drying at room temperature to completely remove the $H_2O$/2-propanol solvent, and then dissolving it again in an organic solvent.

The dissolving process is performed by agitating at 90 to 120° C. for 6 to 72 hours.

Non-limiting examples of the first organic solvent include N-methyl-2-pyrrolidone (NMP), dimethylformamide (DMF), dimethyl acetamide (DMA), tetrahydrofuran (THF), dimethyl sulfoxide (DMSO), acetone, methylethylketone (MEK), tetramethylurea, trimethylphosphate, butyrolactone, isophorone, carbitol acetate, methylisobutylketone, N-butyl acetate, cyclohexanone, diacetone alcohol, diisobutyl ketone, ethylacetoacetate, glycol ether, propylene carbonate, ethylene carbonate, dimethylcarbonate, diethylcarbonate) and mixtures thereof.

The inorganic additive may be used in its original solid state or in a liquid state by dispersing it in a second organic solvent. In this specification, the inorganic additive liquid includes any state of inorganic additive in a liquid organic solvent and may include suspensions and dispersions, but is not limited thereto.

When the inorganic additive is used in a liquid state, the inorganic additive is added to the second organic solvent to prepare an inorganic additive liquid. Suitable solvents for the second organic solvent include 1-propanol, 2-propanol or mixtures thereof.

The cation exchange resin liquid and inorganic additive may be mixed so that the inorganic additive is 0.5 to 10 parts by weight based on 100 parts by weight of the cation exchange resin liquid. When the inorganic additive is less than 0.5 part by weight, dispersion is reduced which increases permeability by hydrocarbon fuel. When it is more than 10 parts by weight, excessive inorganic additive is dispersed in the cation exchange resin of the fabricated polymer electrolyte membrane, and the plate-shaped inorganic additive is not delaminated and the mechanical strength weakens.

A low molecular weight acrylate-based polymer may be further added to the mixed solution. The low molecular weight acrylate-based polymer is generally used in a liquid state. The acrylate-based polymer may be added in an amount of 5 to 10 parts by weight based on 100 parts by weight of the cation exchange resin.

The polymer electrolyte membrane is fabricated by coating the resulting mixed solution on a polymer supporter. The coating may be performed using any method, but the number of coatings is important in fully obtaining the desired effect of the present invention. In one embodiment, the coating is performed twice or more in order to obtain uniform ion conductivity of the polymer electrolyte membrane. Coating three to five times is preferred. The amount of the coating liquid used in coating can be adjusted depending on the thickness of the polymer supporter film and in one embodiment, 200 $cm^2$ of the polymer supporter having a thickness of 50 μm can be coated using 1 g of the mixed solution, but a slightly excessive amount of the coating liquid may generally used.

When the coating is performed only once, or when the mixed solution is cast into a polymer electrolyte membrane film, the pores of the supporter are not completely closed resulting in non-uniform ion conductivity.

Further, it is generally more effective to coat both sides of the polymer supporter with the coating process. The polymer electrolyte membrane has a thickness ranging from 5 to 100 µm. In one embodiment, in order to obtain such a thick polymer electrolyte membrane, it should be dried at 100° C. or more after coating.

Before the mixed solution is coated onto a polymer supporter, the cation exchange resin liquid may be precoated onto the polymer supporter. Through the precoating, the polymer electrolyte membrane only includes cation exchange resin within the pores, that is inside of the polymer supporter, thereby completely closing the pores with the cation exchange resin. The cation exchange resin and inorganic additives are then applied to the surface of the polymer supporter to form the hydrocarbon fuel diffusion barrier layer. In this process, the hydrocarbon fuel diffusion barrier layer has thickness less than or equal to $\frac{1}{3}$ of the polymer supporter.

In the coating process, after a porous substrate is laid onto both sides of the polymer supporter, the mixed solution is coated onto the porous substrate, rolled, and dried. This process may be repeated, and then the porous substrate is removed. The mixed solution is uniformly infused into the pores of the supporter through capillary action, then the solvent is evaporated. Thereby the pores of the supporter can be completely closed off by the delaminated inorganic additive and the cation exchange resin.

A conventional polymer electrolyte membrane using perfluorosulfonic acid has a thickness ranging from 130 µm to 180 µm, so as to inhibit cross-over of hydrocarbon fuel. As the membrane thickness increases, proton conductivity decreases and the cost of the polymer electrolyte membrane increases. The polymer electrolyte membrane of the present invention can significantly improve mechanical properties and reduce cross-over of hydrocarbon fuel through the polymer supporter and nano-sized plate-shaped inorganic additive, even for very thin polymer membranes having a thickness ranging from 5 µm to 100 µm, and preferably 5 µm to 50 µm.

The inorganic additives dispersed in a resin of the polymer electrolyte membrane lengthen the diffusion pathway of hydrocarbon fuel, thereby reducing permeability of the hydrocarbon fuel. Very thin membranes of the present invention ranging from 5 to 100 µm have a barrier effect against hydrocarbon fuels that is equivalent or better than polymer electrolyte membranes that are 180 µm thick. Membranes of the present invention can be used to produce high power density fuel cells. Furthermore, the method of preparing the polymer electrolyte membrane is simple and amenable to large-scale manufacture.

Figure 1C:
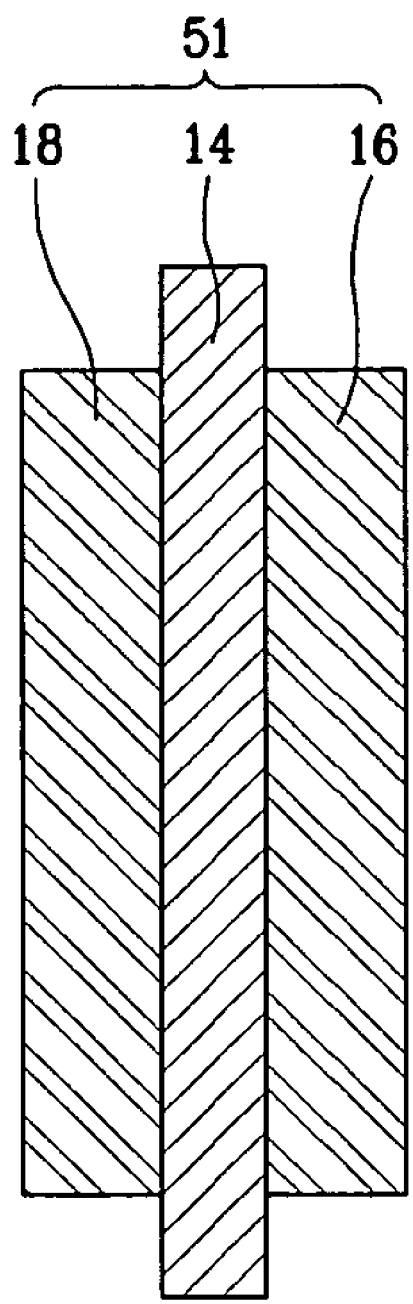
FIG. 1C shows a membrane-electrode assembly of the present invention.

As shown in FIG. 1C, the polymer electrolyte membrane 14 of the present invention is interposed between a cathode 16 and an anode 18 to make up the membrane-electrode assembly.

The cathode and the anode include an electrode substrate and catalyst layer.

The catalyst layer of the electrode includes a metal catalyst which enables the relevant reaction, that is, the oxidation of fuel and the reduction of oxidant. Suitable catalysts include metals selected from the group consisting of platinum, ruthenium, osmium, platinum-ruthenium alloys, platinum-osmium alloys, platinum-palladium alloys, platinum-M alloys where M is at least one transition metal selected from the group consisting of Ga, Ti, V, Cr, Mn, Fe, Co, Ni, Cu and Zn, and combinations thereof. Preferred catalysts include metals selected from the group consisting of platinum, ruthenium, osmium, platinum-ruthenium alloys, platinum-osmium alloys, platinum-palladium alloys, platinum-cobalt alloys and platinum-nickel alloys.

In general, the metal catalyst is supported on a carrier. The carrier may include carbon such as acetylene black or graphite or may comprise particles of inorganic material such as alumina, silica, zirconia, titania. Commercially available catalysts already provided on a carrier may be used, or the carrier may be supported on a carrier using well-known methods which need not be explained in detail here.

In fuel cell systems, fuel is supplied to the anode and an oxidant such as air or oxygen is supplied to the cathode to generate electricity through an electrochemical reaction between the anode and cathode. The fuel is oxidized at the anode, and the oxidant is reduced at the cathode, so that a voltage difference between the electrodes arises.

The electrode substrate may include carbon paper, carbon cloth, carbon felt or metal cloth but is not limited thereto. The electrode substrate supports the catalyst layer and enables reaction fluid to diffuse into and easily access the catalyst layer. A water repellant electrode substrate treated with a fluorine-based polymer may be used in order to prevent a decrease in the efficiency of gas diffusion which may be caused by water generated during operation of the fuel cell. Suitable fluorine-based polymers include polyvinylidenefluoride, polytetrafluoroethylene, fluorinated ethylenepropylene, polychlorotrifluoroethylene, and fluoroethylene polymer.

The electrode may further include a microporous layer in order to increase the gas diffusion effects between the electrode substrate and the catalyst layer. The microporous layer may be formed by coating a composition containing a conductive powder, a binder and an ionomer as needed. In general, the conductive powder can include carbon powder, carbon black, acetylene black, activated carbon, or nano-carbon such as carbon nano tube, carbon nano fiber, carbon nano wire, carbon nano horn, carbon nano ring, or the like. Non-limiting examples of binders include polytetrafluoroethylene (PTFE), polyvinylidene fluoride, copolymers of polyvinylidenefluoride-hexafluoropropylene (PVDF-HFP), polyvinylalcohol and cellulose acetate.

A fuel cell system including the membrane-electrode assembly of the present invention includes at least one electricity generating element, a fuel supplier and an oxidant supplier.

The electricity generating element includes a membrane-electrode assembly which includes a polymer electrolyte membrane with a cathode and an anode positioned at both sides, and separators positioned at both sides of the membrane-electrode assembly. Such an electricity generating element generates electricity through an oxidation of fuel and a reduction of oxidant.

The fuel supplier supplies fuel to the electricity generating element and the oxidant supplier supplies oxidant to the electricity generating element.

Figure 2:
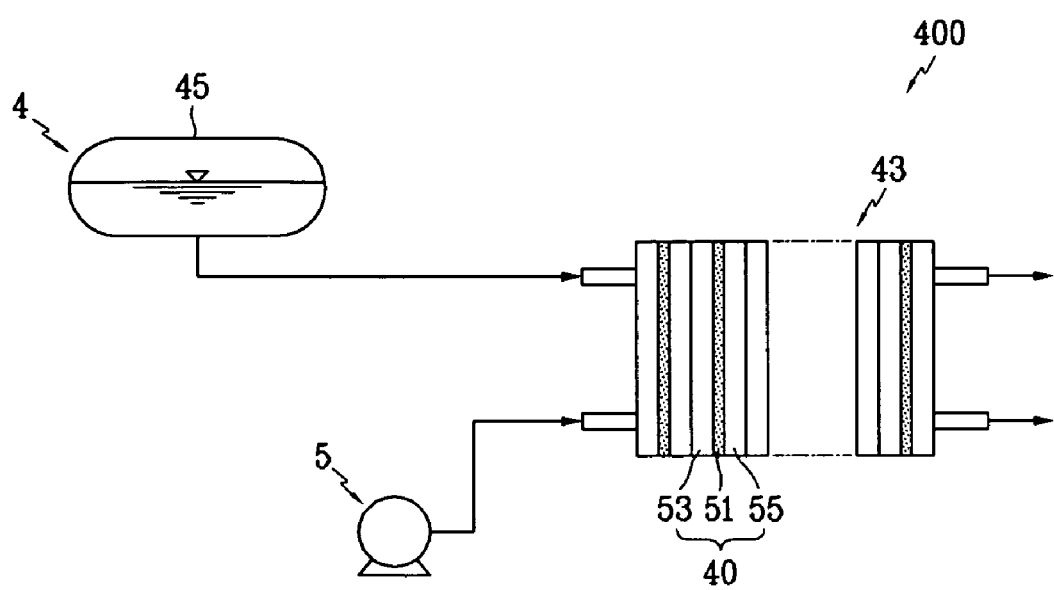
FIG. 2 is a schematic diagram showing the structure of a direct oxidation fuel cell system of the present invention.

The schematic structure of a fuel cell system according to the present invention is illustrated in FIG. 2 which illustrates just one of many embodiments of fuel cell systems. Some such fuel cell systems use pumps to supply the fuel and/or oxidant to the electricity generating element and others supply the fuel and/or oxidant in a diffusion manner instead of by using pumps and the invention is not to be limited to any one specific fuel cell system.

Referring to FIG. 2, the fuel cell system 400 includes a stack 43 which includes at least one electricity generating element 40 to generate electrical energy through oxidation of fuel provided by a fuel supplier 4 and reduction of oxidant provided by an oxidant supplier 5.

According to this embodiment, the fuel supplier is equipped with a pressurized fuel storage tank 45 from which fuel is supplied to the stack 43. The oxidant supplier 5 which supplies oxidant to the electricity generating element 40 of the stack 43 comprises an air pump.

The electricity generating element 40 includes a membrane-electrode assembly 51 which performs oxidation of fuel and reduction of oxidant, and separators (bipolar plates) 53 and 55 which are positioned on both sides of the membrane-electrode assembly 51 and provide fuel and oxidant to the membrane electrode assembly.

The following examples and comparative examples illustrate the present invention in further detail. However, it is understood that the present invention is not limited by these examples.

EXAMPLE 1

Solid NAFION® resin was obtained by evaporating commercially available 5 wt % NAFION®/H$_2$O/2-propanol (Solution Technology Inc., EW=1,100) solution under a vacuum at room temperature while agitating. Cation exchange resin liquid (5 wt % NAFION®/DMAc) was prepared by adding 5 parts by weight of the obtained solid NAFION® resin to 100 parts by weight of dimethylacetamide (Aldrich, DMAc) and agitating mechanically at 100° C. for 24 hours.

Montmorillonite treated with an organic modifying agent (Southern Clay Products, Cloisite 10A, with an aspect ratio of 1/500 at a state where the organic modifying agents are fully intercalated and with a long-axis length of about 0.3 µm) was added into the cation exchange resin liquid in an amount of 2 parts by weight based on 100 parts by weight of the cation exchange resin. Then, the mixture was mixed by a magnet agitator at 100° C. for 24 hours while applying ultrasound to obtain a cation exchange resin liquid mixture (NAFION®)/MMT/DMAc). The cation exchange resin liquid mixture was prepared by intercalating cation exchange resin chains between the montmorillonite layers to delaminate the silicate. The distance between the delaminated silicate layers was 3 nm or more.

A 30 cm$^2$ porous polytetrafluoroethylene polymer supporter (W. L. Gore, 17 mm Gore-Tex, porosity: 80%) was fixed and carbon papers (Toray, TGPH-090) were attached to both sides of the supporter. A coating mix comprising 15 grams of the NAFION®/MMT/DMAc mixed solution was poured over the papers and coated repeatedly using a roller followed by drying at 100° C. This coating and drying process was repeated five times to fabricate a polymer electrolyte membrane for a direct oxidation fuel cell having a thickness of 25 µm, a porous polymer supporter and a hydrocarbon fuel diffusion barrier layer. The polymer supporter was stretched during the coating process to a reduced thickness of 15 µm, and the hydrocarbon fuel diffusion barrier layer was 10 µm.

In the polymer electrolyte membrane, the weight ratio of cation exchange resin, polymer supporter and montmorillonite was 100:13.6:2

Catalyst slurries were prepared by mixing 5 wt % NAFION®/H$_2$O/2-propanol solution, dipropylene glycol and deionized water with Pt—Ru black (where "black" indicates unsupported catalyst, Johnson Matthey, HiSpec 6000) and Pt black (Johnson Matthey, HiSpec 1000) particles, respectively. The slurries were coated by screen printing on a TEFLON® (polytetrafluoroethylene) film followed by drying to obtain catalyst layers. The catalyst layers were positioned on the prepared polymer electrolyte membrane and were thermally-compressed at 200° C. under 200 kgf/cm$^2$ pressure for 3 minutes to obtain a cathode and an anode with a loading amount of 4 mg/cm$^2$ on each side of the electrolyte membrane.

ELAT electrode substrates (gas diffusion layers) from E-Tek Company were positioned to contact the cathode and anode with the polymer electrolyte membrane interposed therebetween, and assembled to fabricate a membrane-electrode assembly.

The prepared membrane-electrode assembly was interposed between polytetrafluoroethylene-coated glass fiber gaskets, and then interposed between two separators having a predetermined shape of gas flow channels and cooling channels, and then was pressed between copper end plates to fabricate a unit cell. Then variations in the output power of the unit cell depending on the operating temperature were measured under an inflow of 1 M methanol and dry air.

EXAMPLE 2

A polymer electrolyte membrane was prepared according to the same method as in Example 1, except that 10 parts by weight of montmorillonite was used based on 100 parts by weight of a cation exchange resin. The weight ratio of cation exchange resin, polymer supporter and montmorillonite in the prepared polymer electrolyte membrane was about 100:13.6:2, which is similar to that of Example 1.

EXAMPLE 3

A polymer electrolyte membrane was prepared according to the same method as in Example 1, except that kaolinite was mixed with the cation exchange resin liquid obtained in Example 1 to prepare the cation exchange resin liquid mixture. The weight ratio of cation exchange resin, polymer supporter and kaolinite in the prepared polymer electrolyte membrane was about 100:13.6:2.

EXAMPLE 4

A polymer electrolyte membrane was prepared according to the same method as in Example 1 except that fluorohectorite was mixed with the cation exchange resin liquid obtained in Example 1 to prepare the cation exchange resin liquid mixture. The weight ratio of cation exchange resin, a polymer supporter and fluorohectorite in the prepared polymer electrolyte membrane was about 100:13.6:2.

EXAMPLE 5

A polymer electrolyte membrane was prepared according to the same method as in Example 1, except that 130 g of the NAFION®/MMT/DMAc cation exchange resin liquid mixture obtained in Example 1 was coated repeatedly onto a 30 µm porous polytetrafluoroethylene supporter. The weight ratio of cation exchange resin, polymer supporter and montmorillonite in the prepared polymer electrolyte membrane was about 100:13.6:2.

EXAMPLE 6

A polymer electrolyte membrane was prepared according to the same method as in Example 1, except as follows. The solid NAFION® resin obtained from Example 1 was dissolved in dimethylacetamide to obtain a NAFION®/MMT/DMAc solution. A coating comprising 45 grams of the solution was repeatedly coated onto a 15 µm porous polytetrafluoroethylene supporter and dried to prepare a 15 µm NAFION®/polytetrafluoroethylene membrane which did not include inorganic additives. A coating of 20 g of the NAFION®/DMAc cation exchange resin liquid mixture obtained in Example 1 was coated onto both sides of the NAFION®/polytetrafluoroethylene membrane to prepare a polymer electrolyte membrane that does not contain silicate in the intermediate layer.

The prepared polymer electrolyte membrane contained cation exchange resin, polymer supporter and montmorillonite in a weight ratio of about 100:13.6:2.

EXAMPLE 7

A polymer electrolyte membrane was prepared according to the same method as in Example 1, except as follows. First and second cation exchange resin liquid mixtures were prepared by respectively adding 4 parts by weight and 2 parts by weight of montmorillonite based on 100 parts by weight of the cation exchange resin. The first and the second cation exchange resin liquid mixtures were coated on both sides of a porous polytetrafluoroethylene polymer supporter. A unit cell was prepared according to the same method as in Example 1 by positioning the surface coated with the first cation exchange resin liquid mixture to face the anode. The prepared polymer electrolyte membrane contained cation exchange resin, polymer supporter and montmorillonite in a weight ratio of about 100:13.6:2.

EXAMPLE 8

A polymer electrolyte membrane was prepared according to the same method as in Example 1 except that NAFION®/MMT/DMAc cation exchange resin liquid mixture was directly coated onto the surface without carbon paper. The prepared polymer electrolyte membrane contained cation exchange resin, polymer supporter and montmorillonite in a weight ratio of about 100:13.6:2.

COMPARATIVE EXAMPLE 1

A cation exchange resin liquid mixture (NAFION®/MMT/DMAc) was prepared according to the same method as in Example 1, with cation exchange resin chains intercalated between the montmorillonite layers to delaminate the silicate. A 30 μm thick NAFION®/MMT polymer electrolyte membrane was prepared by coating the liquid mixture onto a horizontal glass substrate at 110° C. for 12 hours and evaporating the solvent. In order to make the surface of the prepared polymer electrolyte membrane uniform, a pressure of 40 psi was applied at 100° C. for 2 hours after positioning the membrane between 50 μm thick Kapton membranes.

COMPARATIVE EXAMPLE 2

A 25 μm thick polymer electrolyte membrane that does not contain inorganic additives was prepared by coating commercial 5 wt % NAFION®/H2O/2-propanol (Solution Technology Inc. EW=1,100) solution repeatedly onto a 17 μm thick porous polytetrafluoroethylene supporter used in Example 1.

COMPARATIVE EXAMPLE 3

A polymer electrolyte membrane was prepared by treating commercially obtained NAFION® 115 membrane (125 μm thick) from E.I. Dupont with a 100° C. aqueous solution containing 3% hydrogen peroxide and 0.5M sulfuric acid for 1 hour, and washed with 100° C. deionized water for 1 hour.

Measurement of SEM/EDS

Figure 3:
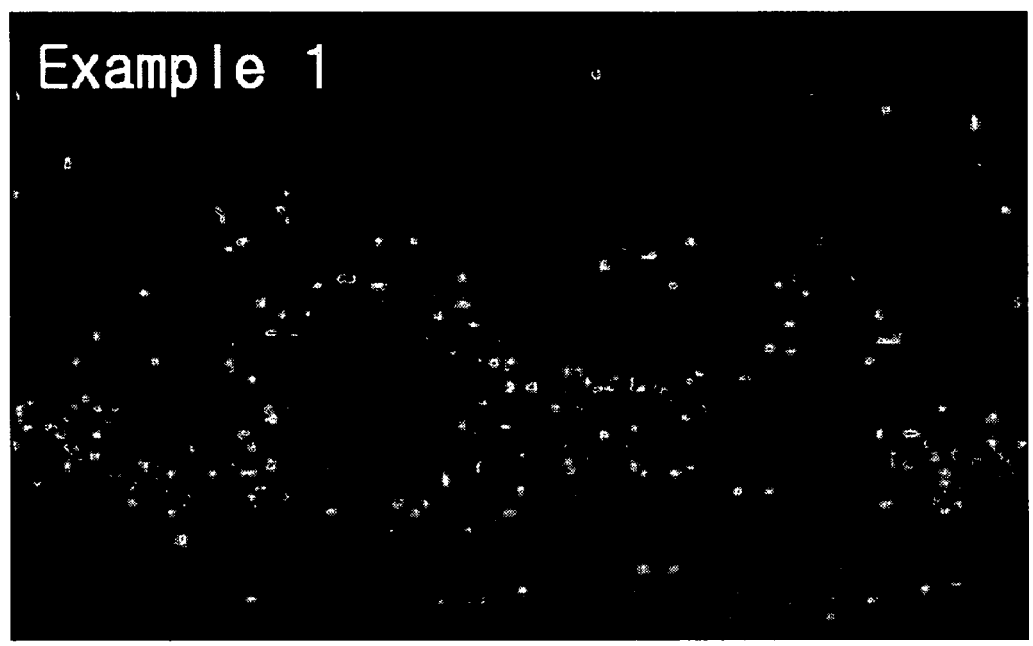
FIG. 3 is a SEM/EDS photograph of an Al-mapped polymer electrolyte membrane according to Example 1 of the present invention.
Figure 4:
FIG. 4 is a SEM/EDS photograph of an Al-mapped polymer electrolyte membrane according to Comparative Example 1.

Al-mapping analyses of silicates of the polymer electrolyte membranes prepared in Example 1 and Comparative Example 1 were performed using SEM/EDS. The results are shown in FIGS. 3 and 4, respectively. As shown in FIG. 4, in the NAFION®/MMT polymer electrolyte membrane of Comparative Example 1 prepared through typical simple solvent evaporation (i.e., a casting process), sedimentation of inorganic silicate occurred during solvent evaporation due to a difference in density between the two materials, so that the particles of inorganic material did not disperse in the electrolyte membrane but became concentrated on the bottom surface. Making a multi-layered structure in order to prevent this from happening is not desirable because resistance components may increase between the electrolyte membrane layers. On the contrary, as shown in FIG. 3, Example 1 which was prepared by coating five times resulted in a uniform distribution of inorganic additive throughout the whole cross-section of the electrolyte membrane.

Measurement of Ion Conductivity

The ion conductivities of the electrolyte membranes according to Example 1 and Comparative Example 1 were measured using a conductivity measurement cell from Bekk-Tech. The measurements were made in accordance with alternating current impedance under controlled relative humidity and a frequency ranging from 100 Hz to 1 MHz, and at 10 mV of perturbation voltage with inflow of humidified hydrogen into the electrolyte membrane. The results of the measurements are shown in Table 1.

TABLE 1

|  | Front-side (Air-side) ion conductivity (S/cm) | Bottom-side ion conductivity (S/cm) |
| --- | --- | --- |
| Example 1 | 0.071 | 0.072 |
| Comparative Example 1 | 0.075 | 0.041 |
| Comparative Example 3 | 0.084 | 0.084 |

As shown in Table 1, the ion conductivities measured on both sides of the electrolyte membrane prepared according to Comparative Example 1 exhibit a conductivity variation between the two surfaces while the conductivity of the two sides of the electrolyte membrane according to Example 1 is uniform. These results indicate that the inorganic additive is uniformly dispersed in the polymer electrolyte membrane according to Example 1, but is distributed more to one side of the membrane in Comparative Example 1.

Dimensional Stability

Figure 5:
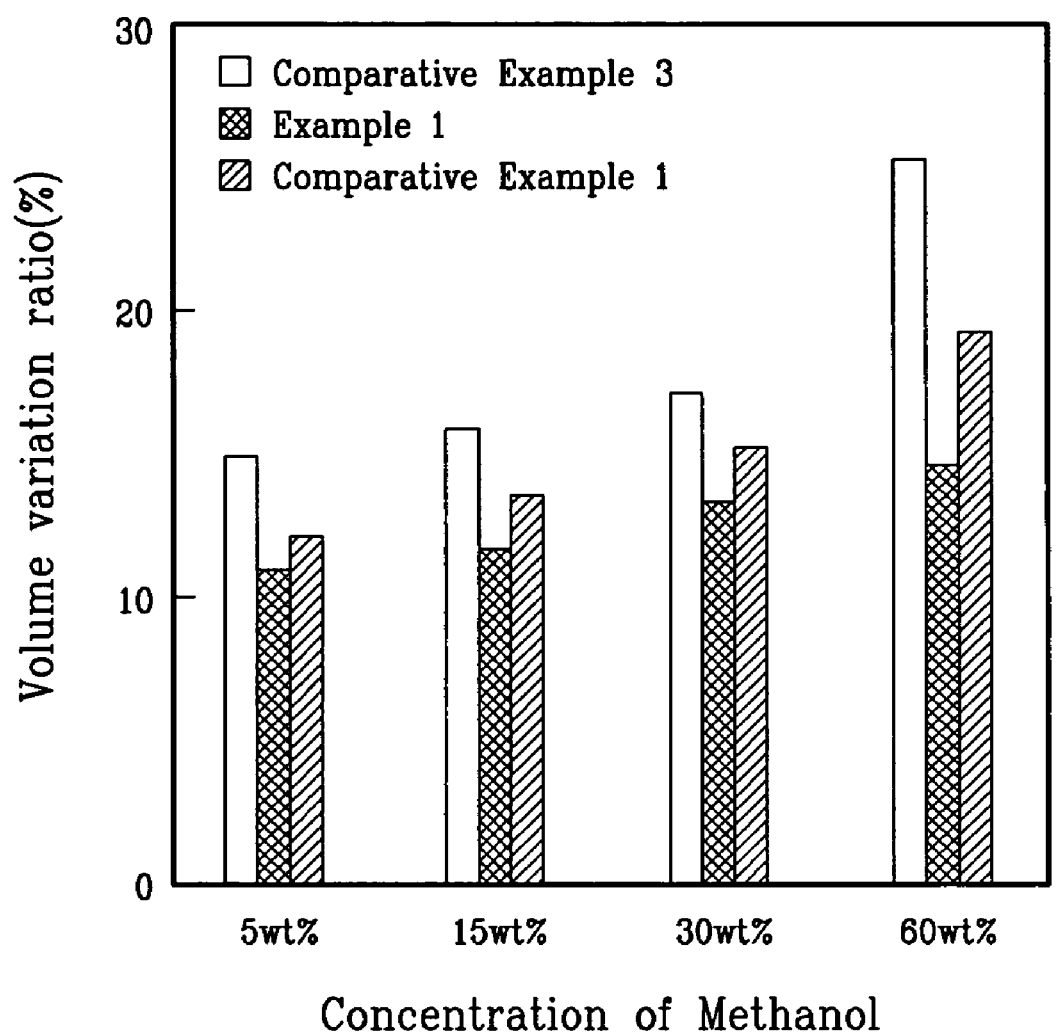
FIG. 5 is a graph showing volume change ratios of the polymer electrolyte membranes according to Example 1 of the present invention and Comparative Examples 1 and 3 depending on varying methanol concentrations.

The dimensional stabilities of the polymer electrolyte membranes according to Example 1 and Comparative Examples 1 and 3 were measured using deionized water and a cosolvent of methanol/deionized water in accordance with ASTM D570. In order to evaluate the dimensional stability, volume changes of the electrolyte membranes depending on methanol concentration were also measured. The results are shown in FIG. 5. As shown in FIG. 5, the electrolyte membrane of Example 1 which is enforced by the polymer supporter and in which inorganic additives are dispersed in a nano-state displayed the most improved dimensional stability, indicating that transfer of excessive stress to the gas diffusion layer due to expansion of electrolyte membrane during long-term operation of the cell may be prevented.

Closing of a Polymer Supporter

Figure 6:
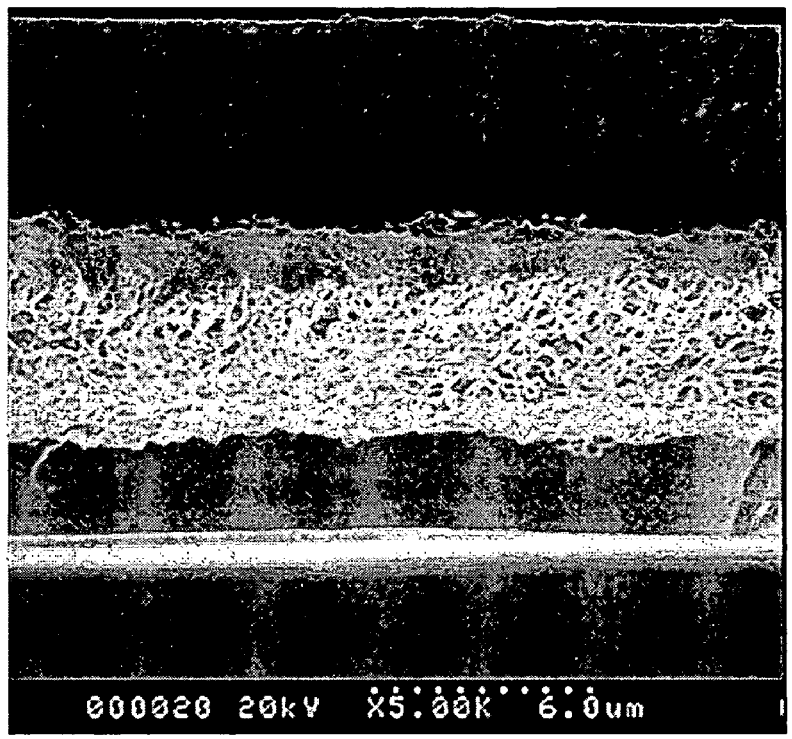
FIG. 6 shows a cross-sectional morphology of the polymer electrolyte membrane according to Example 1 of the present invention.
Figure 7:
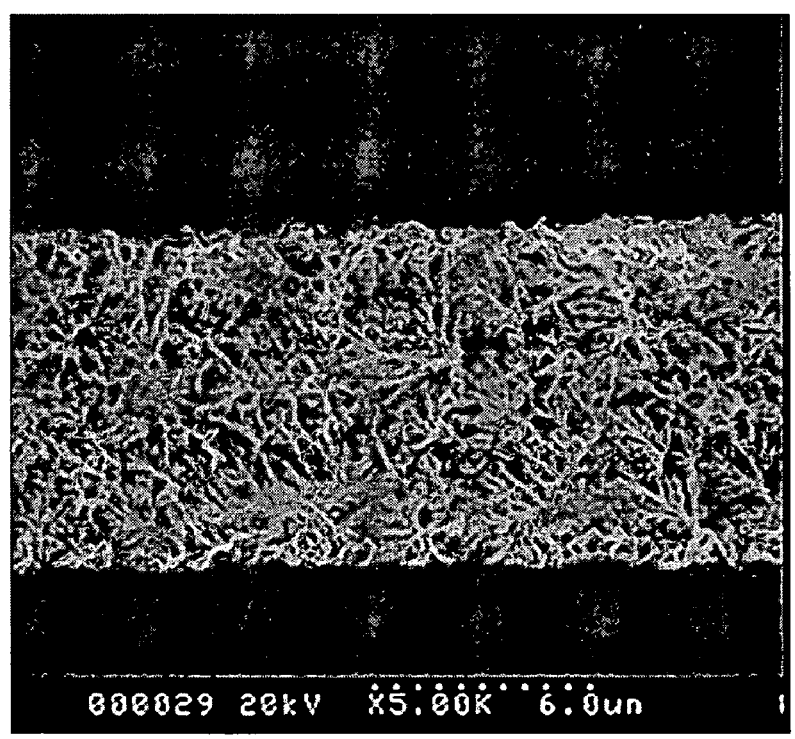
FIG. 7 shows a cross-sectional morphology of the polymer electrolyte membrane according to Comparative Example 1.

SEM photographs of the polymer supporters according to Example 1 and Comparative Example 2 are shown in FIGS. 6 and 7, respectively. As shown in FIGS. 6 and 7, the pores of the polymer supporter in the polymer electrolyte membrane according to Example 1 were closed up more effectively by the cation exchange resin and silicate than those of Comparative Example 2.

BET Porosity

In order to evaluate adherence between the cation exchange resin and the polymer supporter, BET porosities of the membranes according to Example 1 and Comparative Examples 1 to 3 were measured. The results are shown in Table 2. As shown in Table 2, the cation exchange resin liquid mixture according to Example 1 which uses an organic solvent having a high dielectric constant showed improved wettability of highly hydrophobic polymer supporter by a cation exchange resin and inorganic additive than that according to Comparative Example 2 which uses an alcohol-based solvent for coating a polymer supporter. The improved wettability results in a reduction of porosity. A strong mutual association between the cation exchange resin and inorganic additive in the cation exchange resin liquid mixture according to Example 1 results in a lower porosity and more improved barrier properties for methanol fuel than the commercial electrolyte membrane in Comparative Example 3.

TABLE 2

|  | Porosity (%) |
|---|---|
| Example 1 | 6.1 |
| Comparative Example 1 | 8.2 |
| Comparative Example 2 | 17.2 |
| Comparative Example 3 | 9.1 |

Methanol Permeability

The methanol permeability of the electrolyte membrane was measured as follows: an electrolyte membrane sample was positioned in a two-compartment discharge cell, and 15 wt % methanol/deionized water mixture and deionized water were respectively circulated in the two compartments of the discharge cell. At this time, the concentration of methanol that had permeated through the electrolyte membrane was measured by a change in the refractive index. Mechanical properties were measured according to ASTM D882. The results are shown in Table 3.

TABLE 3

|  | Membrane thickness (μm) | methanol permeability (cm · cm$^3$/cm$^2$ · sec) | 0.4 V power output density (mW/cm$^2$, 60° C.) |
|---|---|---|---|
| Example 1 | 25 | $2.7 \times 10^{-7}$ | 80 |
| Example 2 | 25 | $1.0 \times 10^{-7}$ | 50 |
| Comparative Example 1 | 30 | $3.5 \times 10^{-7}$ | 68 |
| Comparative Example 2 | 25 | $3.0 \times 10^{-6}$ | 45 |
| Comparative Example 3 | 125 | $2.0 \times 10^{-6}$ | 56 |

As shown in Table 3, methanol permeabilities of membranes according to Examples 1 and 2 were significantly reduced compared to that of Comparative Examples 2 to 3. In particular, the methanol permeability was also lower than that of the conventional polymer electrolyte membrane having a thickness of 130 μm. Without being bound by theory, these results are thought to arise from the fact that the pores of the polymer supporter in the polymer electrolyte membrane of Example 1 were more effectively closed up than those of Comparative Examples 2 and 3 as described above in reference to FIGS. 6 and 7.

Figure 8:
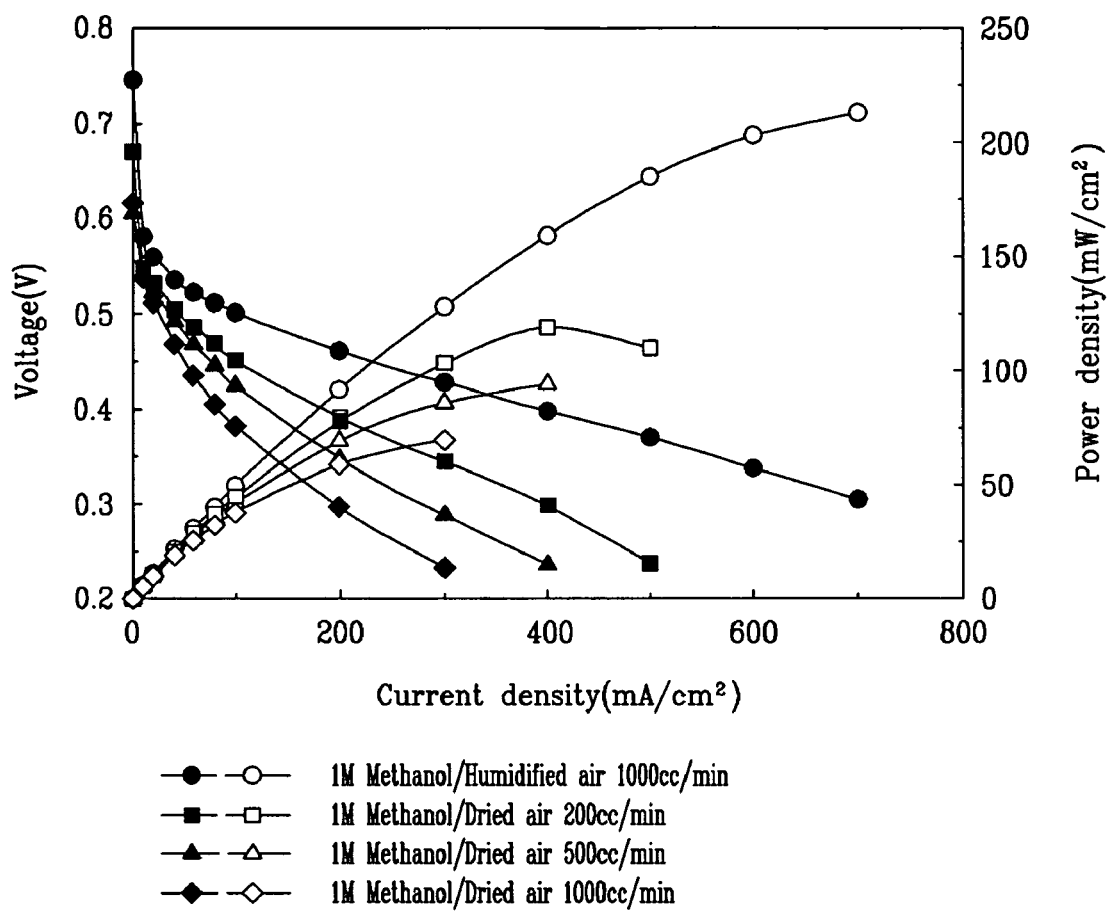
FIG. 8 is a graph showing a power output density of the fuel cell according to Example 1 of the present invention.

The methanol permeability of Example 1 in FIG. 8 is similar to that of Comparative Example 1 in Table 3. However, Example 1 showed improved cell power output density compared to Comparative Example 1 since the conductivity is uniform on either side of the electrolyte membrane in Example 1.

Figure 9:
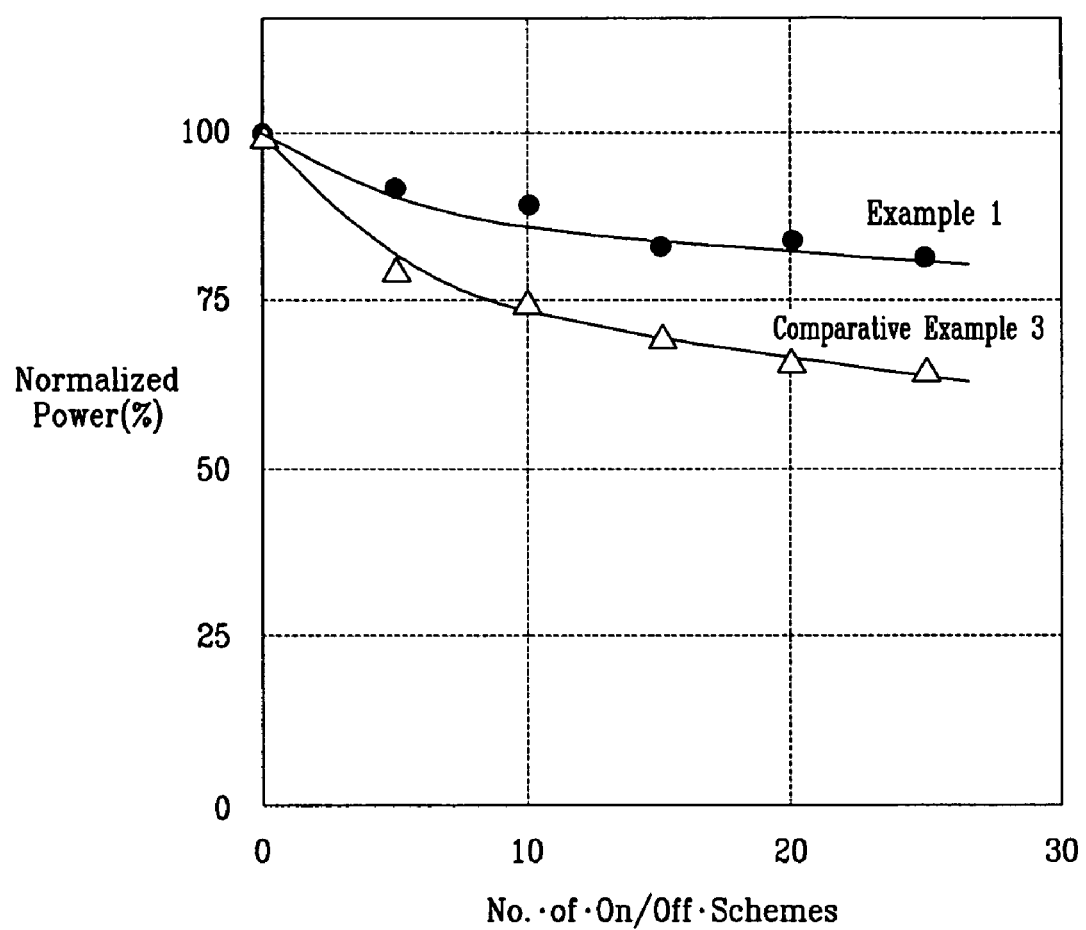
FIG. 9 is a graph showing power output stability of fuel cells according to Example 1 of the present invention and Comparative Example 3.

FIG. 9 shows a change of power output density over time when operating fuel cells fabricated using polymer electrolyte membranes according to Example 1 and Comparative Example 3.

The fuel cells were operated as follows: 1M methanol as the fuel and air as the oxidant were injected into the fuel cells and operated and shut-down once a day at 60° C. while controlling the humidity and flow of the air with oxidant. In FIG. 9, this is identified as the "No. of On/Off Schemes." The electrolyte membrane according to Example 1 which has improved membrane resistance (conductivity/thickness), fuel barrier properties, and dimensional stability was compared to the commercial NAFION® 115 membrane in Comparative Example 3 and displayed better power output stability.

Figure 10:
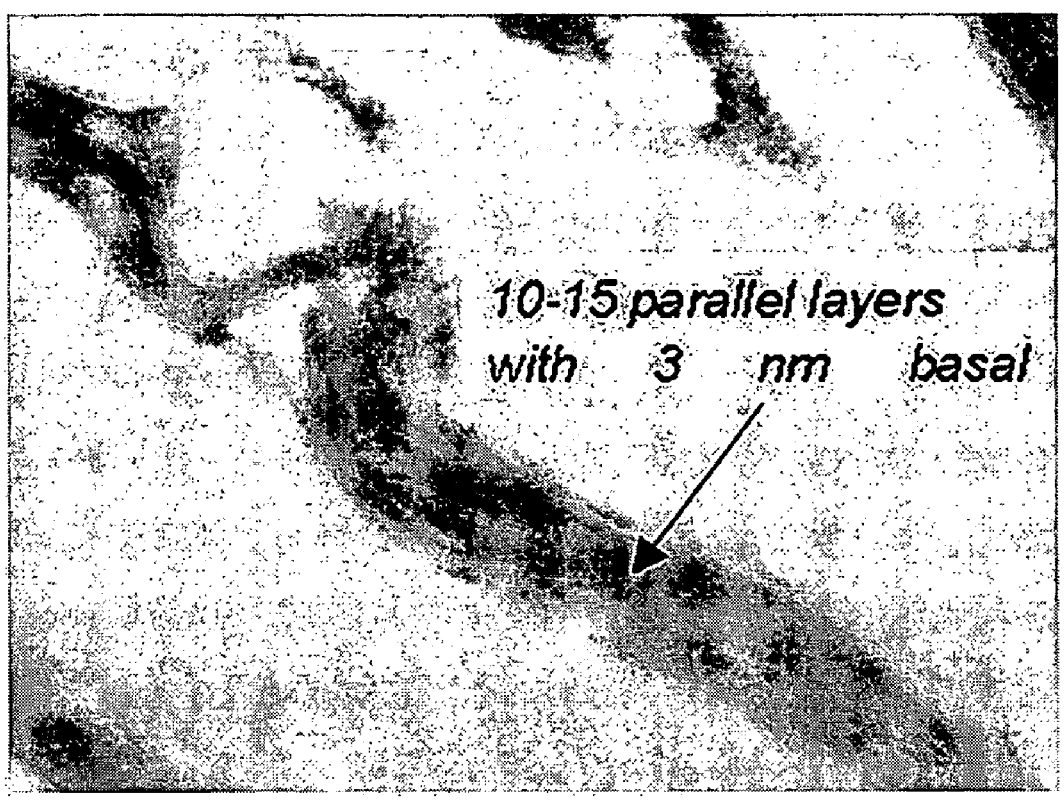
FIG. 10 is a transmission electron micrograph of the polymer electrolyte membrane according to Example 2 of the present invention.

FIG. 10 is a transmission electron micrograph of the electrolyte membrane according to Example 2. It can be seen that the distance between the plates of silicate additive was expanded to about 3 nm by intercalation of cation exchange resin chains between the plates of inorganic silicate with a layered structure. It was confirmed that the plate shaped structure having a regular distance between the layers of the silicates should fall apart or the distance between the layers should be more than or equal to 3 nm in order to display methanol barrier properties through delamination of silicate in the cation exchange resin. However, when hydrophobic silicate particles are added in the cation exchange resin in an excessive amount, hydration of the cation exchange resin is impeded which results in decreased conductivity of the membrane.

The polymer electrolyte membrane for direct oxidation fuel cells of the present invention is prepared by injecting a liquid mixture of cation exchange resin and inorganic additive into the pores of the porous polymer supporter. The membrane can increase the diffusion path of liquid or gas hydrocarbon fuel and have better barrier characteristics against hydrocarbon fuel because the pores of the porous supporter can be effectively closed up, and the silicate additive having a layered structure and high aspect ratio are dispersed in the polymer electrolyte membrane in a delaminated state. Therefore, the membrane can be used in a direct oxidation fuel cell even as a thin membrane, compared with conventional membranes of a more complex design using a porous supporter.

The total methanol permeability of the membrane of the present invention is less than or equal to that of conventional polymer electrolyte membranes for direct oxidation fuel cells (130 to 180 μm thick), even if the thickness is reduced to about ⅕ of the thickness of the conventional membranes. Such reduction in membrane thickness allows improved conductivity for high power fuel cells. Furthermore, the electrode/electrolyte interface is more durable due to improved dimensional stability.

While this invention has been described in connection with what are presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte membrane for direct oxidation fuel cells comprising:
   a porous polymer supporter defining a plurality of pores; and
   a hydrocarbon fuel diffusion barrier layer having a thickness between 2 and 10 μm on the porous polymer supporter and comprising an inorganic additive dispersed in a cation exchange resin,
   wherein at least a portion of the hydrocarbon fuel diffusion barrier layer comprises a discrete layer over a top surface of the porous polymer supporter.

2. The polymer electrolyte membrane of claim 1, wherein the cation exchange resin and inorganic additive are present in at least some of the pores.

3. The polymer electrolyte membrane of claim 1, wherein the porous polymer supporter comprises a material selected from the group consisting of homopolymers of polytetrafluoroethylene, polyvinylidene fluoride, polyethylene, polypropylene, polyimide, polybenzoxazole, polybenzimidazole, and copolymers thereof.

4. The polymer electrolyte membrane of claim 3, wherein the porous polymer supporter comprises a material selected from the group consisting of polytetrafluoroethylene, polyvinylidene fluoride, and copolymers thereof.

5. The polymer electrolyte membrane of claim 4, wherein the porous polymer supporter comprises a polytetrafluoroethylene homopolymer.

6. The polymer electrolyte membrane of claim 1, wherein the porous polymer supporter has a porosity of at least 80%.

7. The polymer electrolyte membrane of claim 6, wherein the porous polymer supporter has a porosity from 80% to 90%.

8. The polymer electrolyte membrane of claim 1, wherein the cation exchange resin comprises a polymer resin that includes at a side chain, a cation exchange group selected from the group consisting of a sulfonic acid group, a carboxylic acid group, a phosphoric acid group, a phosphonic acid group, and derivatives thereof.

9. The polymer electrolyte membrane of claim 1, wherein the cation exchange resin has an ion exchange ratio from 3 to 33, and an equivalent weight ranging from 700 to 2,000.

10. The polymer electrolyte membrane of claim 1, wherein the cation exchange resin comprises a proton conductive polymer selected from the group consisting of fluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, polyphenylquinoxaline-based polymers, and combinations thereof.

11. The polymer electrolyte membrane of claim 10, wherein the cation exchange resin is selected from the group consisting of fluoro-based polymers, polybenzimidazole-based polymers, polysulfone-based polymers, and combinations thereof.

12. The polymer electrolyte membrane of claim 1, wherein the inorganic additive is present in a delaminated form of nano-phase in the cation exchange resin.

13. The polymer electrolyte membrane of claim 1, wherein the inorganic additive comprises a material selected from the group consisting of silica, alumina, zeolite, bariumtitanate, ceramics, inorganic silicate; zirconium hydrogen phosphate, $\alpha\text{-}Zr(O_{a1}PCH_{a2}OH)_a(O_{b1}PC_{b2}H_{b4}SO_{b5}H)_b \cdot nH_2O$ where a1, a2, a, b1, b2, b4, b5 and b are the same or different integers from 0 to 14 and n is an integer from 0 to 50, $\gamma\text{-}Zr(PO_{a1})(H_{a2}PO_{a3})_a(HO_{b1}PC_{b2}H_{b3}SO_{b4}H)_b \cdot nH_2O$ where a1, a2, a3, a, b1, b2, b3, b4 and b are the same or different integers from 0 to 14 and n is an integer from 0 to 50, $Zr(O_{a1}PC_{a2}H_{a3})_aY_b$ where a1, a2, a3, a and b are the same or different integers from 0 to 14, $Zr(O_{a1}PCH_{a2}OH)_aY_b \cdot nH_2O$ where a1, a2, a and b are the same or different integers from 0 to 14 and n is an integer from 0 to 50, $\alpha\text{-}Zr(O_{a1}PC_{a2}H_{a3}SO_{a4}H)_a \cdot nH_2O$ where a1, a2, a3, a4 and a are the same or different integers from 0 to 14 and n is an integer from 0 to 50, $\alpha\text{-}Zr(O_{a1}POH) \cdot H_2O$ where a1 is an integer from 0 to 14, $(P_2O_5)_a(ZrO_2)_b$ glass where a and b are the same or different integers from 0 to 14, $P_2O_5\text{—}ZrO_2\text{—}SiO_2$ glass, and mixtures thereof.

14. The polymer electrolyte membrane of claim 13, wherein the inorganic additive is an inorganic silicate.

15. The polymer electrolyte membrane of claim 14, wherein the inorganic silicate is selected from the group consisting of pyrophylite-talc, montmorillonite (MMT), fluorohectorite, kaolinite, vermiculite, illite, mica, brittle mica, and combinations thereof.

16. The polymer electrolyte membrane of claim 14, wherein the inorganic silicate has an aspect ratio from 1/30 to 1/1000.

17. The polymer electrolyte membrane of claim 14, wherein the inorganic silicate has a long-axis length from 0.05 μm to 0.5 μm.

18. The polymer electrolyte membrane of claim 14, wherein the inorganic silicate has a delaminated layered structure with distances between silicate layers of at least 3 nm.

19. The polymer electrolyte membrane of claim 14, wherein the inorganic silicate is silicate treated by an organic modifying agent.

20. The polymer electrolyte membrane of claim 19, wherein the organic modifying agent comprises at least one compound selected from the group consisting of C1 to C20 alkylamines, C1 to C20 alkylene diamines, C1 to C20 quaternary ammonium salts, aminohexanes and nitrogen-containing heterocyclic compounds.

21. The polymer electrolyte membrane of claim 1, wherein the cation exchange resin is present in an amount from 50 to 90 wt %, the porous polymer supporter is present in an amount from 2 to 30 wt %, and the inorganic additive is present in an amount from 0.5 to 20 wt %.

22. The polymer electrolyte membrane of claim 21, wherein the cation exchange resin is present in an amount from 70 to 80 wt %, the porous polymer supporter is present in an amount from 2 to 15 wt %, and the inorganic additive is present in an amount from 0.5 to 10 wt %.

23. The polymer electrolyte membrane of claim 1, wherein the hydrocarbon fuel diffusion barrier layer further comprises an acrylate-based polymer having a low molecular weight.

24. The polymer electrolyte membrane of claim 1, wherein the hydrocarbon fuel diffusion barrier layer further comprises an acrylate-based polymer in an amount from 5 to 10 parts by weight based on 100 parts by weight of the cation exchange resin.

25. The polymer electrolyte membrane of claim 1, wherein the porous polymer supporter has a thickness from 10 to 15 μm.

26. The polymer electrolyte membrane of claim 1, wherein the polymer electrolyte membrane has a thickness from 5 to 100 μm.

27. The polymer electrolyte membrane of claim 1, wherein the conductivity difference between one side of the polymer electrolyte membrane and an opposite side of the polymer electrolyte membrane upon which a catalyst layer is formed is less than 5%.

28. The polymer electrolyte membrane of claim 1, wherein the polymer electrolyte membrane has a porosity from 1 to 10%.

* * * * *

UNITED STATES PATENT AND TRADEMARK OFFICE
CERTIFICATE OF CORRECTION

PATENT NO.       : 7,811,694 B2
APPLICATION NO.  : 11/251579
DATED            : October 12, 2010
INVENTOR(S)      : Min-Kyu Song et al.

It is certified that error appears in the above-identified patent and that said Letters Patent is hereby corrected as shown below:

In the Claims

Column 19, Claim 13, line 64    Delete "silicate;"
                                Insert -- silicate, --

Column 19, Claim 13, line 65    Delete

"$\alpha\text{-}Zr(O_{a1}PCH_{a2}OH)_a(O_{b1}PC_{b2}H_{b4}SO_{b5}H)_b.nH_2O$"

Insert

-- $\alpha\text{-}Zr(O_{a1}PCH_{a2}OH)_a(O_{b1}PC_{b2}H_{b4}SO_{b5}H)_b \cdot nH_2O$ --

Column 19, Claim 13, line 68    Delete

"$(H_{a2}PO_{a3})_a(HO_{b1}PC_{b2}H_{b3}SO_{b4}H)_b.nH_2O$"

Insert

-- $(H_{a2}PO_{a3})_a(HO_{b1}PC_{b2}H_{b3}SO_{b4}H)_b \cdot nH_2O$ --

Column 20, Claim 13, line 3     Delete

"$Z_r(O_{a1}PCH_{a2}OH)_a Y_b.nH_2O$"

Insert

-- $Z_r(O_{a1}PCH_{a2}OH)_a Y_b \cdot nH_2O$ --

Signed and Sealed this
Thirty-first Day of January, 2012

David J. Kappos
*Director of the United States Patent and Trademark Office*

CERTIFICATE OF CORRECTION (continued)
U.S. Pat. No. 7,811,694 B2

| | |
|---|---|
| Column 20, Claim 13, line 5 | Delete |
| | "α-Zr(O$_{a1}$PC$_{a2}$H$_{a3}$SO$_{a4}$H)$_a$.nH$_2$O" |
| | Insert |
| | -- α-Zr(O$_{a1}$PC$_{a2}$H$_{a3}$SO$_{a4}$H)$_a$·nH$_2$O -- |
| Column 20, Claim 13, line 7 | Delete |
| | "α-Zr(O$_{a1}$POH).H$_2$O" |
| | Insert |
| | -- α-Zr(O$_{a1}$POH)·H$_2$O -- |